United States Patent [19]

Duhrin

[11] Patent Number: 4,581,918
[45] Date of Patent: Apr. 15, 1986

[54] APPARATUS FOR NON-CONTACT THICKNESS GAUGING OF DISC OR SHEET OBJECTS

[75] Inventor: Leif Duhrin, Rönninge, Sweden

[73] Assignee: Esselte Security Systems, Stockholm, Sweden

[21] Appl. No.: 569,154

[22] Filed: Jan. 9, 1984

[51] Int. Cl.⁴ ............................................. G01B 13/04
[52] U.S. Cl. ..................... 73/37.7; 73/37.6
[58] Field of Search ........................ 73/37.6, 37.7, 37.5

[56] References Cited

U.S. PATENT DOCUMENTS

| | | | |
|---|---|---|---|
| 3,285,608 | 11/1966 | Lyman | 73/37.7 X |
| 3,438,244 | 4/1969 | Plumpe | 73/37.5 X |
| 3,485,095 | 12/1969 | Hirata et al. | 73/37.7 X |
| 3,496,744 | 2/1970 | Mizuno et al. | 73/37.7 X |
| 4,292,838 | 10/1981 | Larsen | 73/37.7 |

FOREIGN PATENT DOCUMENTS 1450181 9/1976 United Kingdom .

OTHER PUBLICATIONS

PCT Publication WO81/01609 of PCT/US80/01531, published Jun. 11, 1981.

Primary Examiner—Kenneth M. Schor

[57] ABSTRACT

An apparatus for non-contact gauging the thickness or variations in thickness of disc or sheet objects, for example banknotes, comprising at least two opposed gauges (1,2), between which the object (3) is intended to pass, and a recording or corresponding unit (10) for processing the gauging results.

The apparatus is particularly characterized in that each gauge (1,2) of substantially known kind comprises a pneumatically operated gauge head (4,5), of which the end (6) facing toward the object (3) consists of a preferably axial-symmetric disc-shaped portion (6) with at least one central outlet aperture (7) preferably for compressed air, which portion (6) aerodynamically is designed so that a definite air flow through said outlet aperture (7) is corresponded by a definite distance to the object (3), that the gauge head (4) of at least one gauge (1) is movable to and from the object (3), and that a transducer unit (9) preferably for inductive measurement of said movement is provided and connected to said recording unit (10).

7 Claims, 4 Drawing Figures

APPARATUS FOR NON-CONTACT THICKNESS GAUGING OF DISC OR SHEET OBJECTS

This invention relates to an apparatus for gauging of objects of disc or sheet shape, for example of banknotes, the thickness or variations in thickness in a non-contact way, comprising at least two opposed gauges, between which the object is intended to pass, and a recording or corresponding unit for processing the gauging results. Non-contact gauging means that gauging of objects is accomplished without contact being made between the structural components of the gauging apparatus and the objects being gauged.

BACKGROUND OF THE INVENTION

Known methods of banknote thickness gauging are based on mechanic contact with the banknotes. These methods limit the speed of the banknote transport through the gauge.

Opto-electronic devices based on the reflection of light are known for non-contact measuring the variations in height on one side of a banknote, but not for gauging the thickness of the banknote.

Apparatuses of this kind, besides, involve disadvantages in the form of high costs due to high requirements on the precision of prisms and the like, and of a substantial maintenance demand.

The gauging result, moreover, can be unreliable, because the light beam reflected from black-print portions is deformed.

Apparatuses for non-contact gauging the thickness of strips are previously known. At some of these apparatuses each gauge consists of a nozzle, by which air is ejected against the object, and a measure of the distance between the nozzle and the object is obtained which is in the form of an air pressure. The variations in thickness are recorded as differences in pressure. Apparatuses of this kind have disadvantages which are connected with the compressibility of the air and the normally small magnitude of the pressure differences to be measured. These disadvantages express themselves in the form of reduced accuracy.

SUMMARY OF THE INVENTION

The present invention has the object to produce an apparatus, which shows high gauging accuracy and low maintenance demand, and which is inexpensive and simple.

The invention, thus, relates to an apparatus for non-contact gauging of objects of disc or sheet shape, for example of banknotes, the thickness or variations in thickness, comprising at least two opposed gauges, between which the object is intended to pass, and a recording unit for processing the gauging result.

The apparatus according to the invention is particularly characterized in that each gauge of a subtantially known type comprises a pneumatically operated gauge head, of which the end facing toward the object consists of a preferably axial-symmetric portion of disc shape with at least one central outlet aperture for compressed air, which portion is designed aerodynamically so that a definite air flow through said outlet aperture corresponds to a definite distance to the object, that the gauge head of at least one gauge is movable to and from the object, and that a transducer unit for inductive measurement of the head movement is provided and connected to said recording unit.

BRIEF DESCRIPTION OF DRAWING

The invention is described in greater detail in the following by way of an embodiment and with reference to the accompanying drawing, in which.

DESCRIPTION OF PREFERRED EMBODIMENTS

Figure 1:
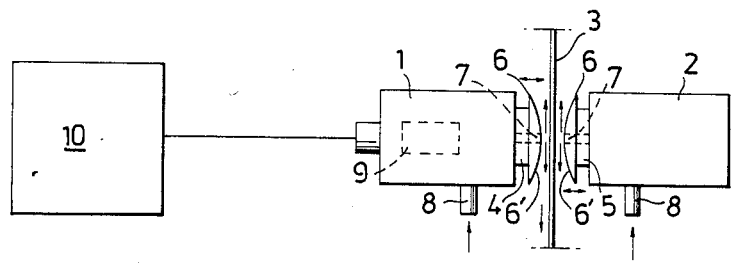
FIG. 1 is a schematic view of an apparatus according to the invention, seen in the longitudinal and movement direction of an object to be gauged, for example a banknote.

In FIG. 1 the numeral 1 designates a first one, and the numeral 2 designates a second one of two opposed gauges arranged in a certain spaced relationship. An object 3 of disc or sheet shape, for example a banknote 3, is intended to pass between the gauges for gauging the thickness or variations in thickness of the object 3 by means of the gauges 1,2.

Each gauge 1,2 of a kind known per se comprises a pneumatically operated gauge head 4 and, respectively, 5, of which the end 6 facing toward the object 3 consists of a preferably axial-symmetric disc-shaped portion 6. The surface 6' of said portion which is intended to face toward the object is slightly curved, i.e. convex. The portion 6 also can be described as a substantially cylindric portion provided with a flange. Each end has a central outlet aperture 7, for compressed air, which opens to the object 3. The compressed air is supplied to the gauges 1,2 via an intake 8 as indicated in FIG. 1. Each portion 6, of course, may be provided with several outlet apertures. The portion 6 is aerodynamically shaped formed so that a definite air flow determined inter alia by the air pressure is related to a definite distance to the object 3 to be measured.

According to a first embodiment, the gauge head 4 of only one gauge 1 is movable to and from the object 3. The gauge 1 comprises a transducer unit 9 of substantially known kind for inductive measurement of the movement of the gauge head 4. The transducer unit 9 is connected to a recording unit 10 for processing the result of the gauging. The gauge head 5 of the second gauge 2 is stationary.

Figure 2:
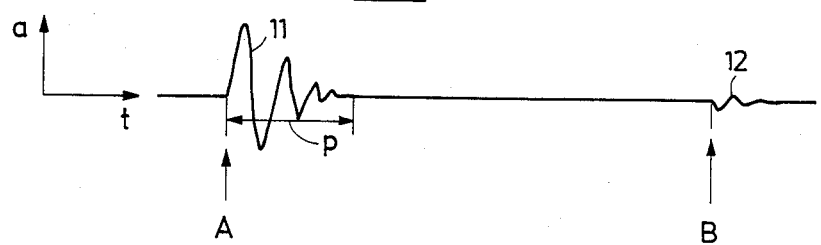
FIG. 2 shows a graph of the gauging process with building-up, transient, portions representative of head oscillations at the beginning and terminal end of the object passed between the gauge heads.

At least the movable gauge head 4 is designed so as to have low weight, and preferably it is manufactured of plastic or the like whereby building-up processes 11,12, as shown in FIG. 2, of only a small extent, or short duration, result from meaningful position changes of the gauge head, as at position changes A,B corresponding to the ends of the object 3. In FIG. 2 a corresponds to movement, and t to time.

The recording unit is arranged in a known suitable manner so that sequential transient measuring resultsl during a predetermined time, such as the time period p in FIG. 2, after a gauge head movement of predetermined amplitude are expected from processing. Hereby the effects of the movements of the head at the beginning end of the object, at A in FIG. 2, as well as at the terminal end, at B in FIG. 2, are eliminated.

According to a second embodiment, the gauge head 5 is also moveable, as indicated by an associated double arrow in FIG. 1. This gauge head, of course, also is designed to have low weight. Even in this embodiment, however, preferably only one gauge head, for example gauge head 4, is provided with a transducer unit 9 connected to the recording unit.

Figure 3:
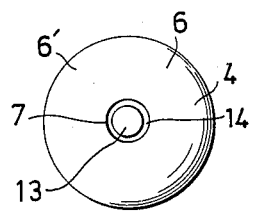
FIG. 3 shows that side of a gauge head which is intended to face toward the object, where a first embodiment of an insert is provided in the air outlet aperture.
Figure 4:
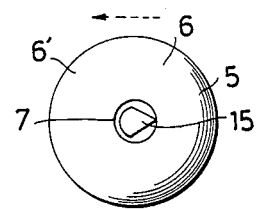
FIG. 4 shows a gauge head in a way corresponding to FIG. 3, where a view of a second embodiment of an insert is provided in the air outlet aperture.

In FIGS. 3 and 4 preferred embodiments of the air outlets of the portions 6 are shown. In the embodiment according to FIG. 3, a substantially circular insert 13 is located in the aperture 7 so that a circular gap 14 is formed, through which air is intended to flow out. In the embodiment according to FIG. 4, in the aperture 7 an insert 15 of substantially circular sector shape is located, preferably arranged as shown relative to the direction, indicated by a dashed arrow, in which the object 3 is intended to be moved past the gauge head.

At one embodiment of the apparatus according to the invention, the movable gauge head 4 carrying a transducer unit is provided with an insert 13, FIG. 3, and the opposed gauge head 5 is provided with an insert 15, FIG. 4.

The mode of operation of the apparatus according to the invention substantially should have become apparent from the aforesaid. The object 3, for example a banknote, is caused to pass between the gauge heads 4,5. When the gauge head 5 is stationary, the object 3 due to the configuration of the portion 6 is sucked inward to the gauge head 5 and maintained at a well-defined distance therefrom. In this way a well-defined reference position of the object 3 is obtained. The movable gauge head 4, due to the configuration of the portion 6, remains at a definite distance from the surface of the object 3 facing toward the gauge head 4. The movement of the gauge head 4 is measured by means of the inductive transducer 9, and the results of the measuring are transferred to and processed by the recording unit where the movement is a measure of the thickness or variation in thickness of the object 3.

At the embodiment where each of two opposed gauge heads 4,5 are movable, the positions of the object and gauge heads in a corresponding manner are adjusted so that the distance of the heads to the respective object side is maintained constant, and the movements of the gauge head 4 are recorded.

The apparatus is a very simple, inexpensive and reliable equipment for gauging the thickness and variations in thickness of sheet objects, for example banknotes. The equipment is adapted for recording rapid processes and, therefore, a high object speed can be used.

The invention has been described above with reference to some embodiments. It is, of course, possible to imagine more embodiments and minor alterations without abandoning the invention idea. The movement of a movable gauge head, for example, can be measured in a way other than inductive, for example in a mechanical way. Also more than two gauge heads, for example four, could be incorporated in an apparatus according to the invention, in which case the recording unit is fed from more transducers.

The invention, thus, must not be regarded restricted to the embodiments set forth above, but can be varied within the scope defined by the attached claims.

I claim:

1. An apparatus for non-contact gauging the thickness or variations in thickness of objects of disc or sheet shape comprising at least two opposed gauges, between which the object is intended to pass, and a recording unit for processing the gauging results, wherein each gauge comprises a pneumatically operated gauge head which has an end portion facing toward the object, which head is disc-shaped and has a convexly curved end surface contour with at least one central outlet aperture for compressed air; said portions being designed such that a definite air flow through a said outlet aperture corresponds to a definite distance to the object; wherein at least one of the gauge heads is movable to and from the object; means for providing an air flow to said outlet aperture; transducer means connected to said at least one movable gauge head and to the recorder means to provide an input to said recorder for measuring movement of at least one movable head; each movable head being of low weight such that displacement phenomena of only short duration are input via said transducer means to the recorder means as a result of changes of position of the movable gauge head; wherein said recording unit is designed such that gauging results due to transient changes of head position during a predetermined time period afer a gauge head movement of predetermined amplitude are excepted from processing and are not recorded whereby the transient effects of the leading and terminal ends of the object passing the gauge heads are eliminated from processing.

2. An apparatus according to claim 1, wherein the end portions of the gauge heads are axially symmetrical.

3. An apparatus as defined in claim 2, wherein said outlet aperture is substantially circular and contains an insert with a substantially circular configuration smaller than said aperture so that a circular outlet gap is formed.

4. An apparatus as defined in claim 2, wherein said outlet aperture is substantially circular and contains an insert with substantially the configuration of a circular sector smaller than and spaced from the perimeter of the aperture and with the pointed portion of the insert directed to the direction, from which an object (3) is intended to be moved past the gauge head.

5. An aparatus as defined in claim 2, where each movable gauge head is made from low weight plastic.

6. An apparatus as defined in claim 2, wherein each of two opposed gauge heads (4,5) are movable to and from the object (3).

7. An apparatus as defined in claim 6, wherein the outlet aperture (7) of one gauge head (4) comprises a circular insert (13), and the outlet aperture (7) of the second gauge head (5) comprises a sector-shaped insert (15).

* * * * *